US012798012B2

(12) United States Patent
Van Wezemael

(10) Patent No.: US 12,798,012 B2
(45) Date of Patent: Nov. 17, 2026

(54) PROCESS AND EQUIPMENT TO LASER CUT VERY HIGH STRENGTH METALLIC MATERIAL

(71) Applicant: ArcelorMittal, Luxembourg (LU)

(72) Inventor: Bert Van Wezemael, Ghent (BE)

(73) Assignee: ArcelorMittal, Luxembourg (LU)

( * ) Notice: Subject to any disclaimer, the term of this patent is extended or adjusted under 35 U.S.C. 154(b) by 748 days.

(21) Appl. No.: 18/037,604

(22) PCT Filed: Nov. 4, 2021

(86) PCT No.: PCT/IB2021/060211
§ 371 (c)(1),
(2) Date: May 18, 2023

(87) PCT Pub. No.: WO2022/106946
PCT Pub. Date: May 27, 2022

(65) Prior Publication Data

US 2023/0415273 A1 Dec. 28, 2023

(30) Foreign Application Priority Data

Nov. 23, 2020 (WO) .................. PCT/IB2020/061042

(51) Int. Cl.
*B23K 26/38* (2014.01)
*B23K 37/04* (2006.01)
(Continued)

(52) U.S. Cl.
CPC .............. *B23K 26/38* (2013.01); *B23K 37/04* (2013.01); *B23K 2101/185* (2018.08); *B23K 2103/04* (2018.08)

(58) Field of Classification Search
CPC ............ B23K 26/0846; B23K 26/0876; B23K 26/38; B23K 37/04; B23K 2101/18; B23K 2101/185; B23K 2103/04
See application file for complete search history.

(56) References Cited

U.S. PATENT DOCUMENTS 4,269,130 A * 5/1981 Burton .................. D05B 35/02
112/475.08
2006/0086703 A1* 4/2006 Liu ........................ B23K 26/38
219/121.72

(Continued)

FOREIGN PATENT DOCUMENTS

CN 104801972 A 7/2015
CN 106001933 A 10/2016

(Continued)

OTHER PUBLICATIONS

Search Report of PCT/IB2021/060211 of Sep. 2, 2022 and International Report on Patentability.

*Primary Examiner* — Justin C Dodson
(74) *Attorney, Agent, or Firm* — Davidson Kappel LLC

(57) ABSTRACT

Laser cutting process to produce n trimmed sub-blanks, n being an integer strictly greater than 1, from a mother blank made of metallic material, having the following steps: Op1/ positioning the mother blank on a cutting table having n laths arranged to be moveable relative to one another in a transverse direction, Op2/ clamping at least part of the mother blank to the cutting table, Op3/ cutting, using a laser source, n untrimmed sub-blanks from the mother blank in a longitudinal cutting direction, Op4/ separating the n laths of the cutting table from one another in a transverse direction, Op5/ releasing the clamping, Op6/ clamping the n untrimmed sub-blanks to the n laths, Op7/ laser trimming the n untrimmed sub-blanks in order to form n trimmed sub-blanks, Op8/ releasing the clamping, Op9/ discharging the n trimmed sub-blanks from the cutting table.

12 Claims, 5 Drawing Sheets

(51) Int. Cl.

| | |
|---|---|
| *B23K 101/18* | (2006.01) |
| *B23K 103/04* | (2006.01) |

(56) References Cited

U.S. PATENT DOCUMENTS

| | | | | |
|---|---|---|---|---|
| 2009/0008373 | A1 | 1/2009 | Muramatsu et al. | |
| 2010/0122970 | A1 | 5/2010 | Caristan et al. | |
| 2010/0122971 | A1* | 5/2010 | Caristan | B23K 26/0838 219/121.72 |
| 2016/0244855 | A1* | 8/2016 | Steinebach | C21D 9/0068 |
| 2019/0308275 | A1 | 10/2019 | Seitz et al. | |
| 2021/0220946 | A1 | 7/2021 | Matsumoto et al. | |
| 2021/0362278 | A1* | 11/2021 | Trojanowski, Jr. | B23K 26/0884 |

FOREIGN PATENT DOCUMENTS

| | | | |
|---|---|---|---|
| CN | 110487459 | A | 11/2019 |
| JP | H11192576 | A | 7/1999 |
| JP | 2001259879 | A | 9/2001 |
| JP | 2012509177 | A | 4/2012 |
| JP | 2015016485 | A | 1/2015 |
| JP | 2020059084 | A | 4/2020 |
| WO | WO2019171150 | A1 | 9/2019 |

* cited by examiner

PROCESS AND EQUIPMENT TO LASER CUT VERY HIGH STRENGTH METALLIC MATERIAL

The present invention relates to a process and an equipment to Laser cut very high strength steel.

BACKGROUND

The ever-increasing demands on vehicle makers to increase the safety performance of vehicles and to diminish their environmental footprints is pushing towards the use of high strength metallic materials, in particular high strength steels. Such materials have for example an ultimate tensile strength above 980 MPa.

SUMMARY OF THE INVENTION

When cutting such metallic materials in order to form blanks to be used for stamping automotive vehicle parts, the manufacturer is confronted with issues of residual stress relief, which results in poor geometric accuracy of the cut blank. This is particularly critical when cutting long and narrow blanks.

Such thin and narrow blanks made of high strength material can have various applications, in particular they can be used in tailor welded blanks, in which case the geometry of the blank and the quality of the cut-edge is particularly critical for the subsequent welding operations.

For example, such thin and narrow blanks can be used in tailor welded blanks to produce floor panels or to produce rocker reinforcements, which are both very long because they span the entire length of the vehicle's passenger cabin and can be very narrow relative to their width in these particular applications.

An object of the present invention is to address the above described technical challenges by providing a process and an equipment which allows to laser cut very high strength metallic materials, to obtain excellent blank geometry, excellent edge quality, excellent productivity and low process scrap.

To this end the present invention relates to a Laser cutting process to produce n trimmed sub-blanks, n being an integer strictly greater than 1, from a mother blank made of metallic material, comprising the following steps:

- Op1/ positioning the mother blank on a cutting table, said cutting table comprising n laths arranged to be moveable relative to one another in a transverse direction,
- Op2/ clamping at least part of the mother blank to the cutting table,
- Op3/ cutting, using a laser source, n untrimmed sub-blanks from the mother blank in a longitudinal cutting direction,
- Op4/ separating the n laths of the cutting table from one another in a transverse direction,
- Op5/ releasing the clamping,
- Op6/ clamping the n untrimmed sub-blanks to the n laths,
- Op7/ laser trimming the n untrimmed sub-blanks in order to form n trimmed sub-blanks,
- Op8/ releasing the clamping,
- Op9/ discharging the n trimmed sub-blanks from the cutting table,
- wherein for a given mother blank, a given untrimmed sub-blank or a given trimmed sub-blank, each operation Opi, i being an integer between 1 and 9, is performed before operation Opi+1.

According to other optional features of the laser cutting process according to the invention, considered alone or according to any possible technical combination:

- The clamping operations Op2 and Op6 are performed using magnetic clamping
- The first clamping operation Op2 is performed only on a part of the surface of the mother blank corresponding to the m last untrimmed sub-blanks to be cut in the first cutting operation Op3, m being an integer comprised between 1 and n−1.
- The laser trimming operation Op7 is performed on each untrimmed sub-blank by laser cutting simultaneously both untrimmed cut edges of each untrimmed sub-blank.
- The length of a trimmed sub-blank as measured in the longitudinal direction is at least twelve times the width of a trimmed sub-blank as measured in the transverse direction.
- The ultimate tensile strength of the mother blank is at least 980 MPa.
- The longitudinal direction of the n trimmed sub-blanks is substantially the same as the rolling direction of a coil from which the mother blank has been cut.

The current invention also relates to a trimmed sub-blank obtained by applying the above described laser cutting process, to a laser welded blank comprising at least one trimmed sub-blank obtained by applying the above described laser cutting process and to a formed part for an automotive vehicle obtained by forming a laser welded blank comprising at least one trimmed sub-blank obtained by applying the above described laser cutting process.

The current invention further relates to a cutting table for a laser cutting process, comprising a plurality of laths arranged to be moveable relative to one another in a transverse direction. Said laths being possibly mounted on at least one linear rail bearing and said laths possibly comprising each a clamping device, preferentially a magnetic clamping device.

The current invention further relates to a cutting line comprising at least one laser cutting head and at least one cutting table corresponding to the above description. Said line can comprise for example at least two cutting tables corresponding to the above description. Said line can comprise for example at least two laser cutting heads.

BRIEF DESCRIPTION OF THE DRAWINGS

Other aspects and advantages of the invention will appear upon reading the following description, given by way of example, and made in reference to the appended drawings, wherein.

DETAILED DESCRIPTION

Figure 1:
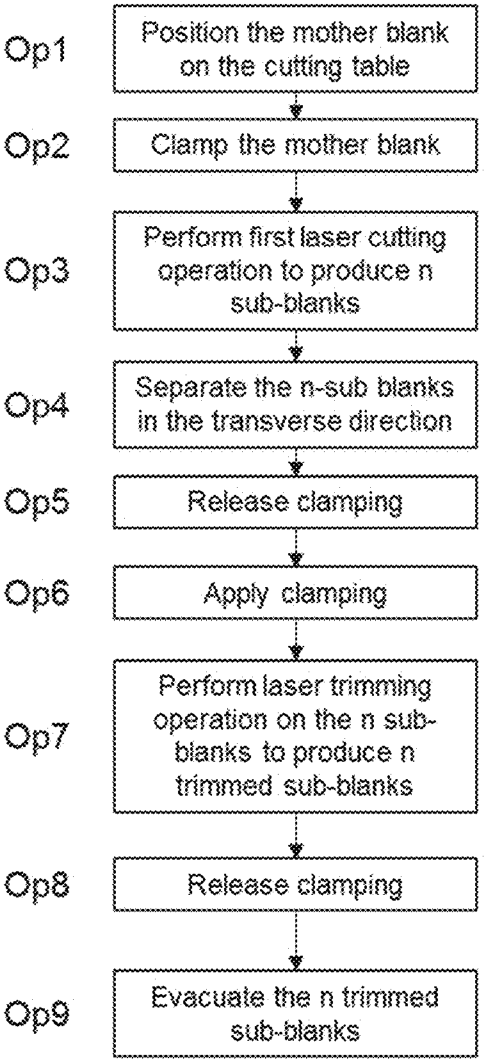
FIG. 1 is a flow-chart of the laser cutting process according to the invention.
Figures 2A, 2B:
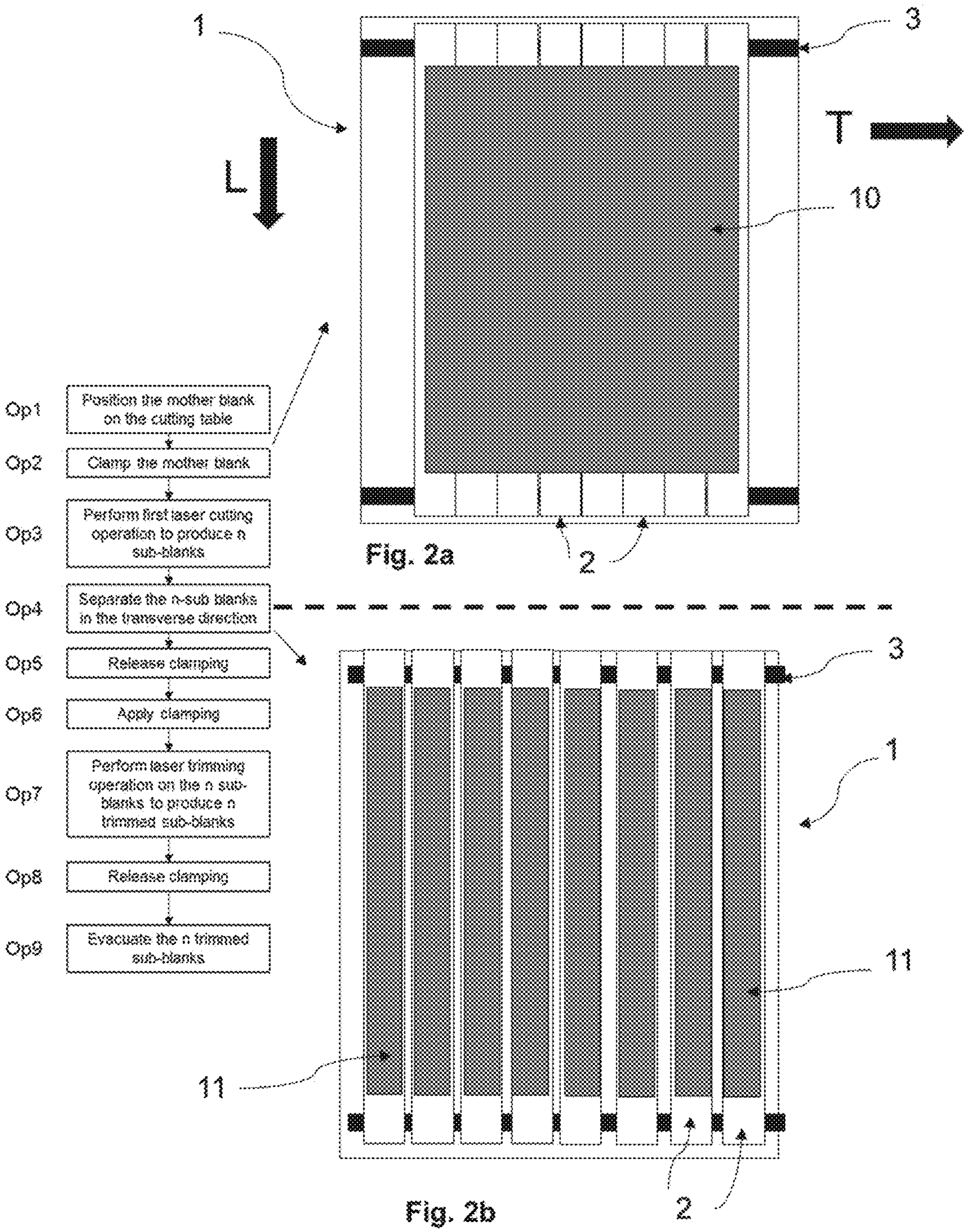
FIGS. 2*a* and 2*b* are top views of a cutting table according to the invention in the two different configurations that it can take during the laser cutting process.

A blank of steel refers to a flat sheet of steel, which has been cut to any shape suitable for its use. A blank has a top and bottom face, which are also referred to as a top and bottom side or as a top and bottom surface. The distance between said faces is designated as the thickness of the blank. The thickness can be measured for example using a micrometer, the spindle and anvil of which are placed on the top and bottom faces. In a similar way, the thickness can also be measured on a formed part.

By "substantially parallel" or "substantially perpendicular" it is meant a direction which can deviate from the parallel or perpendicular direction by no more than 15°.

Tailor welded blanks are made by assembling together, for example by laser welding together, several blanks of steel, known as sub-blanks, in order to optimize the performance of the part in its different areas, to reduce overall part weight and to reduce overall part cost. The sub-blanks forming the tailor welded blanks can be assembled with or without overlap, for example they can be laser butt-welded (no overlap), or they can be spot-welded to one another (with overlap).

In the following description and in the attached figures, for the sake of simplicity, the blanks and sub-blanks which are described and depicted have a generally rectangular shape. However, it should be understood that the invention is not restricted to the case of rectangular blanks and can be applied to blanks having different shapes.

The yield strength, the ultimate tensile strength and the uniform and total elongation are measured according to ISO standard ISO 6892-1, published in October 2009.

Referring to FIGS. 1 to 4*b*, the current invention relates to a process for laser cutting n trimmed sub-blanks 12 (see, e.g., FIG. 4*b*), starting from a mother blank 10 made of metallic material. The longitudinal direction is depicted by the arrow labelled "L" on FIG. 2*a*, while the transverse direction is depicted by the arrow labelled "T" on FIG. 2*a*. In the present description, the length of an untrimmed or trimmed sub-blank 11, 12 refers to the dimension of a sub-blank as measured in the longitudinal direction—the width of an untrimmed or trimmed sub-blank 11, 12 refers to the dimension of a sub-blank as measured in the transverse direction. In the present description, the length of an untrimmed or trimmed sub-blank 11, 12 is greater than the width of an untrimmed or trimmed sub-blank 11, 12.

In the following description, the terms "top" and "bottom" will be defined according to the longitudinal direction—for example referring to FIG. 1*a*, the top corresponds to the top of the figure, while the bottom refers to the bottom of the figure.

In the following description, the terms "left" and "right" will be defined according to the transverse direction—for example referring to FIG. 1*a*, the left corresponds to the left of the figure, while the right refers to the right of the figure.

The mother blank 10 is for example cut from a steel coil, which is for example a high strength steel coil, having an ultimate tensile strength above 980 MPa. A steel coil is a long sheet of steel which has been conditioned in the form of a coil for packaging, handling, transportation and subsequent processing. A steel coil has a rolling direction which corresponds to the direction in which the steel was processed during the hot-rolling and/or cold rolling step of the steel production process. A steel coil has a generally very long length when uncoiled in the rolling direction (in the order of several hundred meters, sometimes even kilometers), while having a limited maximum width due to the limitations of the production equipment (limitations of the size of the equipment in the width direction, limitation of the strength of the manufacturing equipment, for example of the hot-rolling or cold cold-rolling equipment). As a consequence, when producing very long sub-blanks, with a length which is higher than the maximum width of the steel coil, the longitudinal direction of said sub-blanks will be the same direction as the rolling direction of the steel coil from which it is produced.

The mother blank 10 is cut for example from a steel coil as described above. For example, the mother blank 10 is cut on a cutting line using a mechanical shear, or on a blanking line using cutting dies, or on a laser blanking line using laser cutting to produce the mother blank from the steel coil. For example, the mother blank 10 is cut such that the length of the mother blank 10 is oriented in the rolling direction of the coil and is greater than the width of the mother blank 10, which corresponds substantially to the width of the steel coil. As explained previously, this cutting direction is the only possible to produce a mother blank 10 having a longitudinal direction which is higher than the maximum achievable width of said steel coil.

Referring to FIGS. 3*a*, 3*b* and 4*a*, 4*b*, an untrimmed sub-blank 11 refers to a sub-blank which has been cut directly from the mother blank 10 without any subsequent processing step. Said untrimmed sub-blank 11 has two untrimmed cut-edges 111, which correspond to the edges of said untrimmed sub-blank 11 which have been produced by the above cutting operation from the mother blank 10.

Figures 4A, 4B:
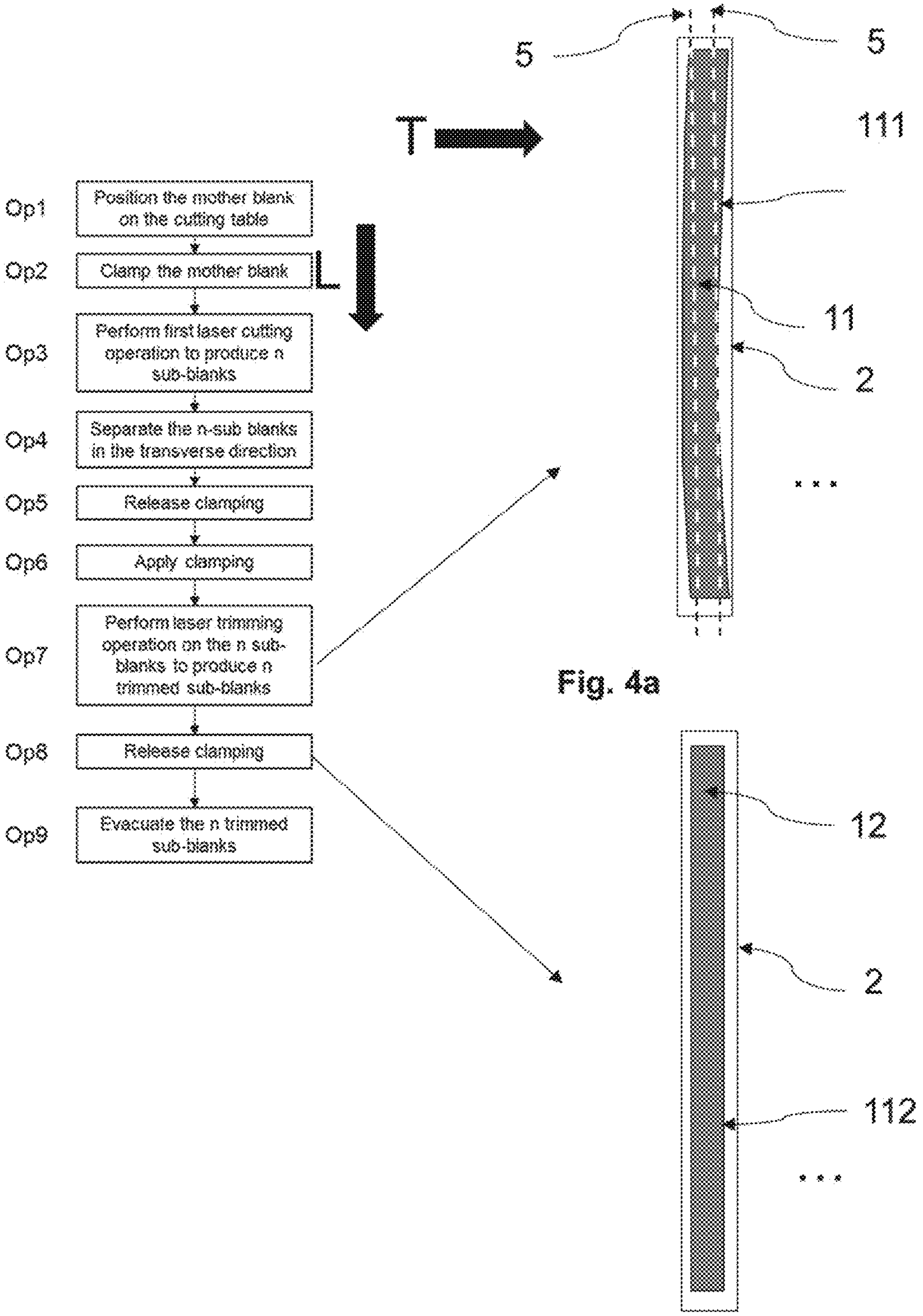
FIGS. 4*a* and 4*b* are top views of a sub blank respectively during process steps Op7 and Op8 according to the invention.

Referring to FIGS. 4*a* and 4*b*, a trimmed sub-blank 12 refers to a sub-blank which has been produced from an untrimmed sub-blank 11 by further performing a cutting step, referred to as a trimming step, on the cut-edges 111 of said untrimmed sub-blank 11, to form two trimmed cut edges 112.

For productivity reasons, it will be interesting to use the maximum possible number n of trimmed sub-blanks 12 which are cut within a single mother blank 10. Indeed, the cutting process involves an operation of positioning the mother blank 10 on the cutting line, which takes some time. The higher the number n, the faster the total cutting process time per blank will be. For example, the total number of trimmed sub-blanks n per mother blank 10 is 8. For example, the total number of trimmed sub-blanks n per mother blank 10 is 16.

The process of the current invention is particularly suited in cases where the ratio between the length of the trimmed sub-blanks 12 to the width of the trimmed sub-blanks 12 is high. In this type of configuration, when cutting the sub-blanks from the mother blank, there can be issues of geometry of the shape of the untrimmed sub-blanks 11. In particular, there are risks that the untrimmed sub-blanks 11 takes on a crooked shape after it has been cut from the mother blank 10, which is also known as a "banana shape". Without wanting to be bound by theory, this type of deformation is due to the fact that the material has internal stresses inherited from the steel manufacturing process. For example, these internal stresses come in part from the hot rolling and/or the cold rolling step. For example, these internal stresses come in part from the annealing step after cold rolling and/or from the quenching step after annealing and/or from the skin-passing step after annealing. In the case of laser cutting, another reason that can explain geometry issues on the untrimmed sub-blanks 11 is the thermal input of the laser cutting operation, which can induce additional mechanical stress and issues related to thermal shrinkage for example.

Figures 3A, 3B:
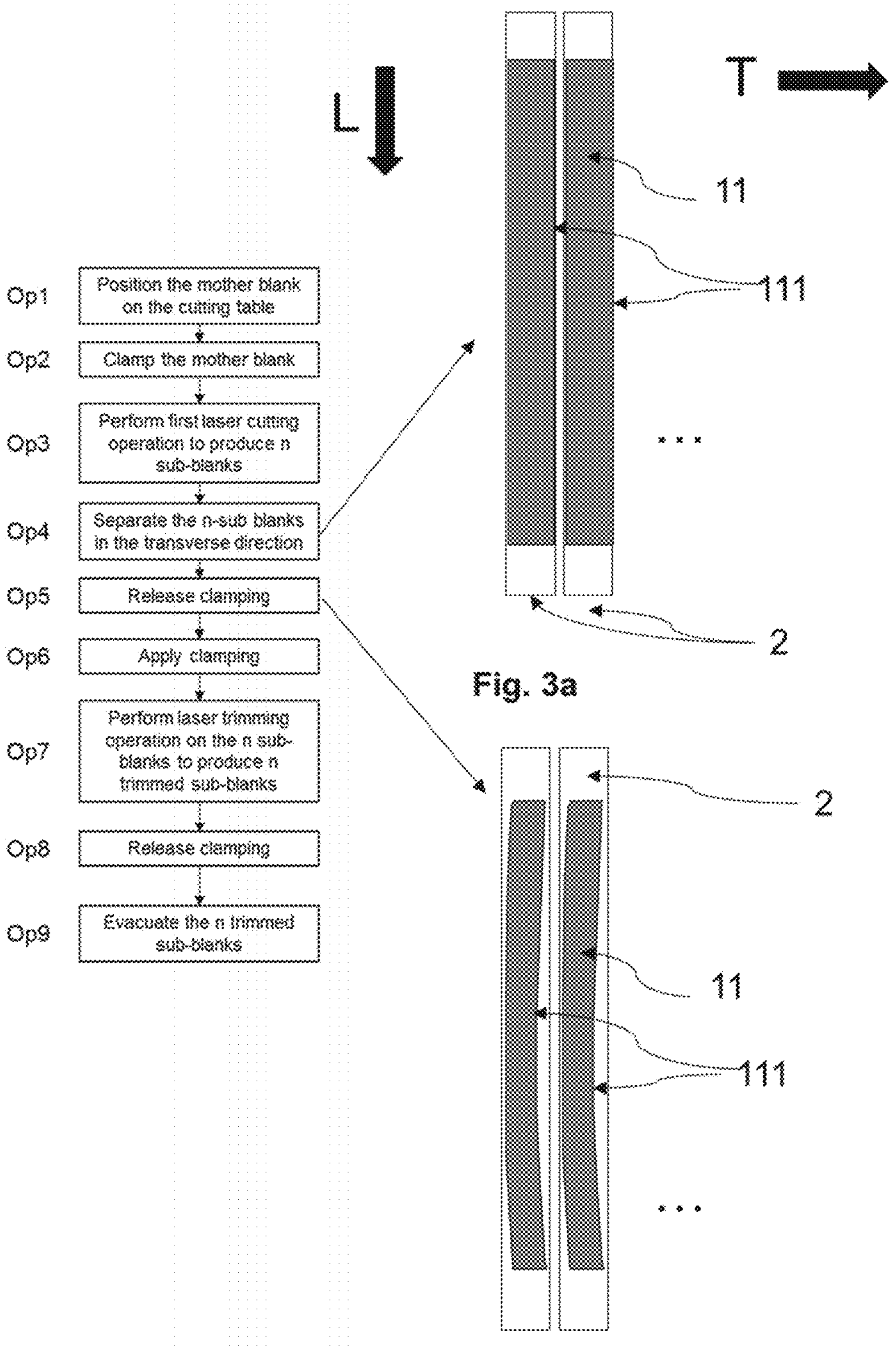
FIGS. 3*a* and 3*b* are top views of 2 untrimmed sub blanks respectively after process stages Op4 and Op5 according to the invention.

The crooked shape of the untrimmed sub-blank 11 is illustrated on FIG. 3*b*. Resembling the general shape of a banana, the top and bottom part of the untrimmed sub-blank 11 are oriented to one side (in this case the right side, however it could be the opposite, according to the way the internal stresses are distributed within the mother coil 10), while the middle part of the untrimmed sub-blank 11 in the longitudinal direction is oriented to the opposite side (in this case the left side). In other words, even though the cutting operation to produce the untrimmed sub-blanks 11 from the mother blank 10 was made following a straight line, the resulting cut edges 111 are not straight, but rather follow a curvilinear path. This shape defect can be significant, for example the top and bottom of the untrimmed sub-blank 11 can be offset by up to several millimeters compared to the middle of the sub-blank 11. It should be understood that the above described crooked or "banana shape" is a very schematic description, that the direction in which this deformation takes place and its amplitude can be very variable from one mother blank 10 to the other and within a given mother blank 10 from one untrimmed sub-blank 11 to the other. Indeed, the deformation comes from the manufacturing history of the mother blank 10 and each blank potentially has a different history coming from the many possible variations in the industrial processes involved.

In the case when the intended shape of the sub-blanks is not rectangular, the same type of issue will occur: the cut edges 111 will not follow the contour according to which the cutting operation was performed.

The above described geometrical issues are particular critical in the following conditions:

- the length of the untrimmed sub-blanks 11 is significantly bigger than their width. Indeed, when this is not the case, the crooked shape of the untrimmed sub-blanks 11 will not be significant and will not induce significant issues. For example, the inventors have found that the crooking issue starts to be very pronounced when the length of the untrimmed sub-blanks 11 is at least twelve times the width of the untrimmed sub-blanks 11.
- the material from which the mother blank 10 is made has a very high strength. Indeed, when this is not the case, the above described residual stresses within the blanks are not sufficient to cause any significant shape distortion. For example, the shape issues become critical when the material has an ultimate tensile strength above 980 MPa.
- another factor is the subsequent use of the sub-blanks. Indeed, when the sub-blanks are used in applications for which the final shape requirements are not strict, the above described geometrical issues might not be a critical industrial issue. However, in many applications, the shape of the sub-blanks needs to be very precise. This is for example the case when using said sub-blanks for butt to butt laser welding, in which the cut edges 112 of the trimmed sub-blank 12 is welded to another blank. Butt to butt laser welding requires very precise positioning of the blanks to be welded in order to keep a constant distance between the edges to be welded. This is not possible when significant crooking of the blanks occurs. Practically speaking, in an industrial operation, the trimmed sub blanks 12 will be submitted to quality control and the sub-blanks which do not mean the fixed standard, such as the geometry standard, will be rejected. If a significant amount of material does not meet the quality standard, there will be a significant amount of rejected material, in other words a significant amount of process scrap. This will increase production costs and decrease productivity.

On top of the above described geometrical issues, the quality of the trimmed sub-blanks 12 will also be related to the cut-edge quality of said sub-blank. When looking at a cross section along a plane perpendicular to the cut edge 112, it is desirable to have a straight cut-edge 112 forming a straight angle with the top and bottom faces of the sub-blank. This is known as the cut edge quality. For example, in the case of laser butt to butt welding, said cut edge quality is also very important to maintain a fixed distance between the edges to be welded and for the subsequent quality of the welded part. It is known that one of the best industrially reachable cut edge quality is the one afforded by the laser cutting process. Contrary to mechanical shearing, there are not issues of mechanical burr and the edge profile is very even. Furthermore, the edge quality is not dependent on the state of the cutting tools, as is the case in mechanical shearing, whereby the edge quality steadily diminishes between two maintenance operations of the cutting tools. In the case of laser cutting, the fact that there is no direct contact between the tools and the material to be cut means that there is no deterioration of the tooling through the cutting operation itself and that there is downtime for cutting tool maintenance. This in turn diminishes the process scrap and increases the productivity.

In a particular embodiment, the mother blank 10 is made from a steel having a chemical composition comprising in weight %: 0.13%<C<0.25%, 2.0%<Mn<3.0%, 1.2%<Si<2.5%, 0.02%<Al<1.0%, with 1.22%<Si+Al<2.5%, Nb<0.05%, Cr<0.5%, Mo<0.5%, Ti<0.05%, the remainder being Fe and unavoidable impurities and having a microstructure comprising between 8% and 15% of retained austenite, the remainder being ferrite, martensite and bainite, wherein the sum of martensite and bainite fractions is comprised between 70% and 92%. With this composition, the steel sheet has, as measured in the rolling direction, a yield strength comprised between 600 MPa and 750 MPa and an ultimate tensile strength comprised between 980 MPa and 1300 MPa while keeping a total elongation above 19%.

In a particular embodiment, the mother blank 10 is made from a steel having a chemical composition comprising in weight %: %: 0.15%<C<0.25%, 1.4%<Mn<2.6%, 0.6%<Si<1.5%, 0.02%<Al<1.0%, with 1.0%<Si+Al<2.4%, Nb<0.05%, Cr<0.5%, Mo<0.5%, the remainder being Fe and unavoidable impurities and having a microstructure comprising between 10% and 20% of retained austenite, the remainder being ferrite, martensite and bainite. With this composition, the steel sheet has, as measured in the rolling direction, a yield strength comprised between 850 MPa and 1060 MPa and an ultimate tensile strength comprised between 1180 MPa and 1330 MPa while keeping a total elongation above 13%.

MS1500:

In a particular embodiment, the mother blank 10 is made from a steel having a chemical composition comprising in weight %: 0.15%≤C≤0.5%, for example, the steel has a fully martensitic microstructure and an ultimate tensile strength above 1500 MPa.

According to the current invention and as depicted on the flow chart of FIG. 1, the cutting process to produce n trimmed sub blanks 12 for a mother blank 10, made of metallic material, comprises the following steps, labelled as operations Op1, Op2, etc.:

- Op1/ positioning the mother blank 10 on a cutting table 1 (see, e.g., FIG. 2*a*), said cutting table 1 comprising n laths 2 arranged to be moveable relative to one another in a transverse direction
- Op2/ clamping at least part of the mother blank 10 to the cutting table 1

- Op3/ cutting, using a laser source, n untrimmed sub-blanks 11 from the mother blank 10 in a longitudinal cutting direction
- Op4/ separating the n laths 2 of the cutting table 1 from one another in a transverse direction
- Op5/ releasing the clamping
- Op6/ clamping the n untrimmed sub-blanks 11 to the n laths 2
- Op7/ laser trimming the n untrimmed sub-blanks 11 in order to form n trimmed sub-blanks 12
- Op8/ releasing the clamping
- Op9/ discharging the n trimmed sub-blanks 12 from the cutting table For a given mother blank 10, a given untrimmed sub-blank 11 or a given trimmed sub-blank 12, each operation Opi, i being an integer comprised between 1 and 9, is performed before operation Opi+1.

Each operation will be subsequently explained in more details.

Op1 merely consists of positioning the mother blank 10 on the cutting table 1 and does not deserve further explanation, as it is a standard operation, specific to each cutting line. Suffice it to say that this operation generally amounts for part of the process time which enters into the productivity calculations of the process. In order to minimize the productivity loss associated to Op1, it is interesting to provide a mother blank 10 from which the biggest possible number n of sub-blanks can be produced. Furthermore, as will be explained later, it is interesting to design a cutting line having at least two cutting tables 1 so that Op1 can be performed while another blank is being cut on another cutting table 1.

Op2, which consists in clamping the mother blank 10 to the cutting table 1, is also a standard operation on a cutting line. Indeed, in order to cut with precision, it is important that the blanks are positioned precisely and do not move during the cutting process or due for any other reasons such as for example movements of the cutting table 1 itself or vibrations on the line, etc. The clamping itself can be performed using any available clamping technology. For example, mechanical clamping can be considered. Advantageously, magnetic clamping allows to clamp efficiently magnetic blanks such as steel blanks and allows to do so without any contact between a clamping device and the blank to be clamped. This is particularly interesting in the case of laser cutting because the magnetic clamping system is not directly in contact with the blank and therefore there is no risk that the laser beam could damage the clamping device during the cutting operation.

Op3 involves the use of a laser source to produce the n untrimmed sub-blanks 11 from the mother blank 10. This first cut is also known as the "freedom cut", because the untrimmed sub blanks 11 are freed from the mother blank 10. The laser cutting technology itself is well known. In a particular embodiment, laser cutting can be performed using more than one laser source in order to perform several laser cuts simultaneously and thus increase the productivity. The order in which the untrimmed sub-blanks 11 are cut from the mother blank 10 can be programmed in different ways to best suit the industrial constraints and installations. For example, when using two laser sources for cutting, the cuts can be performed with each laser head starting on opposite sides of the mother blank 10 and meeting in the middle. For example, when using two laser sources for cutting, the cuts can be performed with each laser head starting side by side in the middle and gradually moving in opposite transversal directions to finish on opposite sides of the mother blank 10.

Op4 involves separating the n untrimmed sub-blanks 11 from each other in a transverse direction by using the specific features of the cutting table 1. The cutting table 1 comprises n laths 2 which can be spaced from one another in the transverse direction. Each lath 2 corresponds to the subsequent position of its corresponding untrimmed sub-blank 11 after it has been cut from the mother blank 10. Each lath 2 comprises a clamping mechanism which can be used to clamp its corresponding untrimmed sub-blank 11 as will be seen during the further operations of the process. For example, the laths 2 can be mounted on a linear bearing 3 in order to be moved in the transverse direction, as depicted on FIGS. 2*a* and 2*b* which shows the positions of the laths 2 respectively before and after Op4. For example, the laths are moved relative to one another in the transverse direction by 10 to 12 mm.

Op5 involves releasing the clamping after the freedom cut has been performed. The deformation of the untrimmed sub-blanks 11 in the "banana shape" only takes place after the clamping is released, i.e. after Op5. Indeed, before the unclamping operation, the untrimmed sub-blanks 11 are held in position by the clamping mechanism and can therefore not deform into their natural resting shape. This is depicted in FIGS. 3*a* and 3*b*, which is a schematic representation of the shape of the untrimmed sub-blanks 11 respectively before and after Op5. Now that the untrimmed sub-blanks 11 have actually taken their natural shape, the subsequent trimming operation to set them to their correct final shape can be applied.

Op6 involves applying again clamping to the untrimmed sub-blanks 11 in order to prepare them for the laser trimming step. Indeed, in order to be correctly held in place for the laser trimming operation, the untrimmed sub-blanks 11 need to be tightly held in place by clamping. Each lath 2 on which the untrimmed sub-blanks 11 are resting is equipped with a clamping mechanism, for example each lath 2 is equipped with magnetic clamping.

Op7 involves laser trimming the n untrimmed sub-blanks 11 in order to form n trimmed sub-blanks 12. This is done by cutting with a laser the untrimmed cut-edges 111 to form two trimmed cut edges 112. For example, the trimming operation removes in the order to 2 to 3 mm of width of material on either side of the untrimmed sub-blank 11 to form the trimmed sub-blank 12. FIG. 4*a* is a schematic rendition of the trimming step Op7, said trimming being performed along the dashed lines 5 in order to obtain the trimmed sub-blank 12 of FIG. 4*b*. Op7 allows to produce a trimmed sub-blank 12 having the desired final sub-blank shape, and being free of the internal stresses which are present in the untrimmed sub-blank 11 before releasing the clamping at Op5. Indeed, after Op5, the untrimmed sub-blank 11 are free of internal stress, which by releasing themselves have deformed the general shape of the untrimmed sub-blank 11 into the crooked "banana shape". Thanks to the fact that the individual untrimmed sub-blanks 11 have been transversally separated from one another during Op4, there is no risk that some parts of two adjacent sub-blanks 11 could overlap on to one another because of the "banana shape" effect. This means that the laser trimming operation Op7 can take place without risk of mistakenly cutting part of the adjacent blank, which would inevitably lead to shape issues of the trimmed sub-blanks 12, which would need to be scrapped. It also means that the adjacent untrimmed sub-blanks 11 do not need to be moved in some way if an overlap is detected, which would involve additional detection equipment and additional time to move the untrimmed sub-blanks 11, resulting in deteriorated productivity and also possible quality issues due to low reproducibility of the position of the untrimmed sub-blank 11.

Op8 involves releasing the clamping on the trimmed sub-blanks 12. At this point, contrary to what happens after Op5, there is little or no deformation due to internal stresses, because the untrimmed sub-blanks 11 from which the trimmed sub-blanks 12 have been produced were free of internal stresses.

Op9 involves evacuating the n untrimmed sub-blanks 12 from the cutting table 1 by known means in order to free said cutting table for processing the next mother blank 10.

As was mentioned, the above described processing steps take place sequentially for a given mother blank 10, a given untrimmed sub-blank 11 or a given trimmed sub-blank 12. When looking at the overall process however, some operations can take place simultaneously or in a different order for different sub-blanks. This will be of particular interest to increase the overall productivity of the process. For example, once the first untrimmed sub-blank 11 has been cut from the mother blank 10 (Op3), its corresponding lath 2 can move transversally to separate said first untrimmed sub-blank 11 from the rest of the material (Op4) and the clamping on said first untrimmed sub-blank 11 can be released (Op5)—at the same time the cutting of further untrimmed sub-blanks 11 (Op3) from the same mother blank 10 can still be taking place. Therefore, Op3 for a given sub-blank can take place simultaneously to Op4 and/or Op5 for another sub-blank. The point is that for any given sub-blank the above described processing steps take place in the above described order.

The inventors have found that the invention could be successfully applied to give very good results in terms of blank shape and cut edge quality even without clamping the whole surface of the mother blank 10 to the cutting table 1 during Op2. This can be interesting for productivity reasons because the unclamping step of Op5 can be time consuming if applied to each of the n sub-blanks. For example, when magnetic clamping is applied, the unclamping operation can take in the order of 1 to 2 seconds. In a particular embodiment, the clamping operation Op2 is performed only on a part of the surface of the mother blank 10 corresponding to the m last untrimmed sub-blanks to be cut in the first cutting operation Op3, m being an integer comprised between 1 and n−1. By so doing, it will not be necessary to perform Op5 on the first n−m untrimmed sub-blanks 11, which were located on areas of the cutting table 1 on which the magnetic clamping of Op2 was not applied. This will allow to gain some unclamping time and therefore to increase the productivity.

As concerns the laser trimming step Op7, it can be interesting to perform simultaneous laser trimming on both untrimmed cut edges 111 of a given untrimmed sub-blank 11 to further optimize the final quality and shape of the corresponding trimmed sub-blank 12. Indeed, laser trimming generates heat on the side of the sub-blank—if it is performed one untrimmed cut edge 111 at a time, the heat input during the laser trimming is asymmetrical and this can lead to some internal stress creation due to differential thermal expansion and shrinking which will can lead to some deformation of the trimmed sub-blank 12 after releasing the clamping during step Op8. In a particular 4. In a particular embodiment, the laser trimming operation Op7 is performed on each untrimmed sub-blank 11 by laser cutting simultaneously both untrimmed cut edges 111 of each untrimmed sub-blank 11. By laser cutting simultaneously, it is meant that the two laser beams used for trimming move at the same speed, starting in a position where they are substantially aligned with one another in the transverse direction.

The present invention also concerns a trimmed sub-blank 12 obtained by applying the above described laser cutting process.

The present invention also concerns a laser welded blank comprising at least one trimmed sub-blank 12 obtained by applying the above described laser cutting process.

The present invention also concerns a formed part for an automotive vehicle obtained by forming a laser welded blank comprising at least one trimmed sub-blank 12 obtained by applying the above described laser cutting process.

The current invention also concerns the specific cutting table 1, equipped with at least n laths, used to apply the above described cutting process. Said cutting table 1 comprises n laths 2 which can be spaced from one another in the transverse direction. Each lath 2 comprises a clamping mechanism, for example a magnetic or mechanical clamping mechanism. For example, the laths 2 can be mounted on a linear bearing 3 in order to be moved in the transverse direction.

Figure 5:
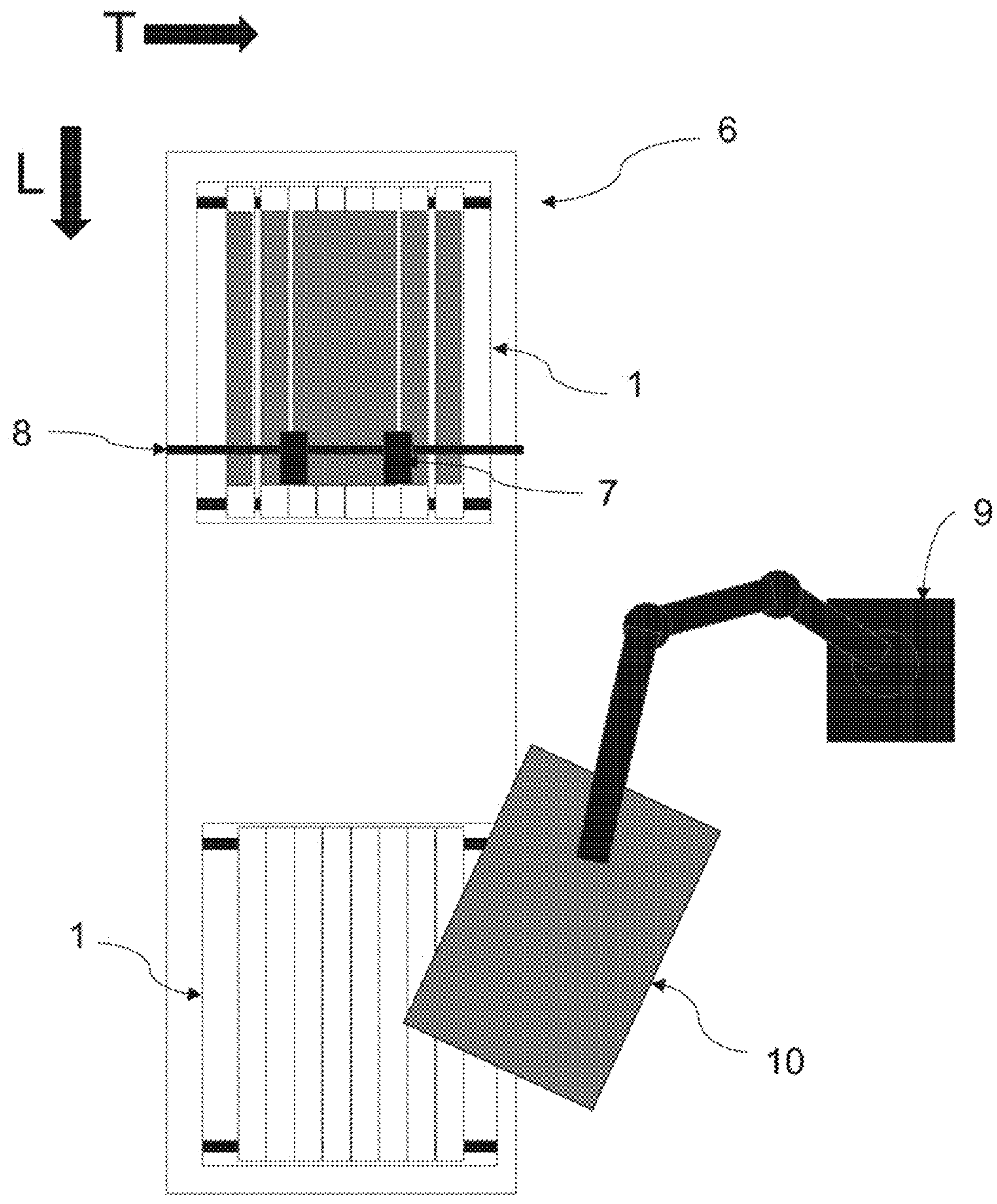
FIG. 5 is a top view of a laser cutting line according to a specific embodiment of the current invention.

Referring to FIG. 5, the current invention also concerns a cutting line 6 equipped with at least one cutting table 1 having the previously described features to implement the above described cutting process and having at least one laser cutting head 7. For example, as depicted on FIG. 5, the line 6 has two cutting tables 1 and two laser cutting heads 7. Advantageously, this allows for example to perform Op1 and Op2, i.e. positioning the mother blank 10 and clamping said mother blank 10, on a first table, while the laser heads 7 are busy with cutting and/or trimming operations on a second table. Also, this allows to perform the last operations, Op8 and Op9, i.e. releasing the clamp on the trimmed sub-blanks 12 and evacuating the trimmed sub-blanks 12 from a first cutting table, while the laser heads 7 are busy with cutting and/or trimming operations on a second table. This type of sequencing and production organization is particularly advantageous because it means that the laser heads 7 are constantly at work and not idle during material handling and clamping operations. This in turns ensures maximum productivity and efficient use of the laser heads 7, which are expensive and highly productive pieces of equipment that should be as much as possible not be left idle.

FIG. 5 shows an example of such a cutting line 6 with a top and bottom table 1, in which two laser heads 7 are mounted on a rail 8 along which they can move in a transverse direction, said rail being itself moveable within the line 6 in a longitudinal direction. In FIG. 5, the cutting process is on-going on the top table. The laser heads 7 are moving from the opposite edges of the mother blank 10 towards the center to perform the freedom cuts Op3. Two first untrimmed sub-blanks 11 have been cut (Op3) and their corresponding laths 2 have been separated from their adjacent lath (Op4). The laser heads are finishing the freedom cut (Op3) of another set of two untrimmed sub-blanks 11. While this is taking place, a robot 9 is positioning a new mother blank 10 on the bottom table 1 to prepare it for the cutting process.

What is claimed is:

1. A laser cutting process to produce n trimmed sub-blanks from a mother blank made of metallic material, the process comprising the following steps, including operations Opi, where i is an integer between 1 and 9, and n is an integer strictly greater than 1, including:

operation Op1: positioning the mother blank on a cutting table, the cutting table including n laths arranged to be moveable relative to one another in a transverse direction;

operation Op2: clamping at least part of the mother blank to the cutting table;

operation Op3: cutting, using a laser source, n untrimmed sub-blanks from the mother blank in a longitudinal cutting direction, each of the n laths supporting a corresponding one of the n untrimmed sub-blanks;

operation Op4: separating the n laths of the cutting table from one another in the transverse direction, thereby separating the n untrimmed sub-blanks from one another in the transverse direction;

operation Op5: releasing the clamping;

operation Op6: clamping the n untrimmed sub-blanks to the n laths, such that each n untrimmed sub-blank is clamped to its corresponding n lath;

operation Op7: laser trimming the n untrimmed sub-blanks to form n trimmed sub-blanks;

operation Op8: releasing the clamping; and operation Op9: discharging the n trimmed sub-blanks from the cutting table;

for a given mother blank, a given untrimmed sub-blank or a given trimmed sub-blank, each operation Opi, i being an integer between 1 and 8, is performed before operation Opi+1.

2. The laser cutting process as recited in claim 1 wherein the clamping operations Op2 and Op6 are performed using magnetic clamping.

3. The laser cutting process as recited in claim 1 wherein the clamping operation Op2 is performed only on a part of the surface of the mother blank corresponding to m last untrimmed sub-blanks to be cut in the cutting operation Op3, m being an integer between 1 and n−1.

4. The laser cutting process as recited in claim 1 wherein the laser trimming operation Op7 is performed on each untrimmed sub-blank by laser cutting simultaneously both untrimmed cut edges of each untrimmed sub-blank.

5. The laser cutting process as recited in claim 1 wherein the length of a trimmed sub-blank as measured in the longitudinal direction is at least twelve times the width of a trimmed sub-blank as measured in the transverse direction.

6. The laser cutting process as recited in claim 1 wherein the ultimate tensile strength of the mother blank is at least 980 MPa.

7. The laser cutting process as recited in claim 1 wherein a longitudinal direction of the n trimmed sub-blanks is similar to a rolling direction of a coil from which the mother blank has been cut.

8. The laser cutting process as recited in claim 1 wherein the n laths are mounted on at least one linear bearing and, in the separating operation Op4, are moved in the transverse direction along the at least one linear bearing.

9. The laser cutting process as recited in claim 1 wherein each untrimmed sub-blank deforms after the clamping is released in operation Op5, and the laser trimming operation Op7 is performed after the blank deforms.

10. The laser cutting process as recited in claim 9 wherein each untrimmed sub-blank deforms into a crooked resting shape only after the clamping is released in operation Op5, and the laser trimming operation Op7 is performed after the blank deforms into the crooked resting shape.

11. The laser cutting process as recited in claim 9 wherein the separating of the n laths of the cutting table from one another in the transverse direction in the operation Op4 prevents the blanks from overlapping each other upon deforming in operation Op5.

12. The laser cutting process as recited in claim 2 wherein the magnetic clamping in operation Op6 is performed by a magnetic clamping device provided on each lath, without contact between the magnetic clamping device and the untrimmed sub-blank.

* * * * *